June 28, 1966 G. OLBRICH 3,257,859
FRICTION WHEEL DRIVE ARRANGEMENTS
Filed May 8, 1964
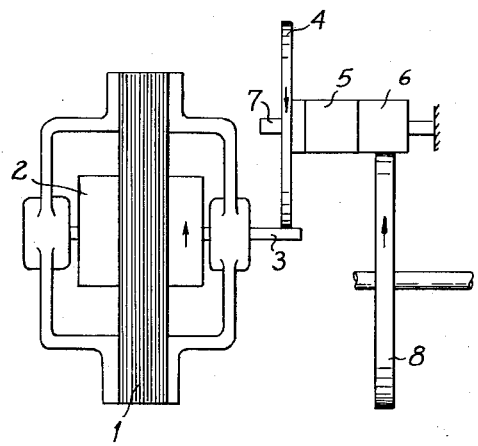
INVENTOR
GÜNTHER OLBRICH

United States Patent Office 3,257,859
Patented June 28, 1966

3,257,859
FRICTION WHEEL DRIVE ARRANGEMENTS
Günther Olbrich, Munich, Germany, assignor to Sud-Atlas-Werke G.m.b.H., Munich, Germany, a corporation of Germany
Filed May 8, 1964, Ser. No. 365,936
Claims priority, application Germany, May 9, 1963, S 85,100
7 Claims. (Cl. 74—208)

The invention relates to friction wheel drive arrangements.

Single phase split pole asynchronous motors are frequently used as drive transmissions in dictating machines of the magnetic recording type. It is a characteristic of such motors that an oscillation of the rotor at twice the operating frequency is superimposed on the otherwise constant rotary movement of the rotor. As a result of the rigid coupling between the rotor and the motor shaft, this oscillation is transferred through a reduction gear disposed between the motor and a drive member, such as a capstan, for the medium to be magnetically recorded so that a similarly periodic variation in speed of the recording medium relative to a recording head in such a dictating machine takes place, with the result that a signal being recorded is recorded with a superimposed frequency modulation at the frequency of the above-mentioned oscillation.

It is known to reduce this transfer of the oscillation frequency from the motor to the recording medium by interposing flywheel masses between the driving motor and the drive member for the recording medium, or by fitting the motor itself with such a flywheel mass, the motor for this purpose being for example constructed as an external rotor motor. These known damping possibilities have, however, the disadvantage that they are expensive and moreover cause a considerable delay in running up to the desired speed.

It has been proposed to provide one of the friction wheels in a friction wheel drive with a resilient rim, for example having teeth of rubber or a rubber-like material. This solution is disadvantageous, since in friction wheel drives a certain minimum Shore hardness has to be present, if permanent indentations in the friction layer are not to occur when the drive is stationary. Moreover, if rubber which is too soft is used, a correspondingly increased power is required from the drive motor.

It is an object of the invention to provide a friction wheel drive arrangement for operation by an electric motor the rotary movement of which has superimposed thereon an undesired oscillation or hunting at a predetermined frequency.

It is a further object of the invention to provide a friction drive arrangement in which effective damping of the oscillation frequency can be achieved in a simple and effective manner.

It is a further object of the invention to provide a friction wheel drive arrangement for a magnetic recording device, the drive arrangement having a resilient intermediate member in the form of a torsion member. By this it is achieved that the resilient intermediate member is only torsionally loaded, but is not subjected to radial pressure, and that it is not subjected to any load during non-operative periods, so that formation of depressions does not have to be feared, as would be the case with friction drives having soft rubber friction surfaces. On the other hand, such an effective damping of the above-said oscillation frequency can be achieved by means of the torsion member, and flywheel means can in general be avoided.

The torsion member preferably consists of a solid or hollow cylinder of rubber or similar resilient elastomeric material, which at one end is fixedly connected with a driven part of an intermediate friction wheel and at the other end is fixedly connected with a driving part of the said intermediate wheel. The torsion member is preferably so dimensioned that the inherent resonant frequency between the driving side and the driven side lies so far below the oscillation frequency of the driving motor shaft, that the oscillations of the motor shaft are damped by the elastomeric material of the torsion member.

The above and other objects and advantages of the invention will be apparent from the following description taken in conjunction with the accompanying drawing, which is given by way of example and which illustrates a friction wheel drive arrangement for a magnetic recording device.

The rotor 2 of a split pole electric motor 1, by means of a drive shaft 3, drives an intermediate friction wheel 4, 5, 6, which is freely rotatable on a shaft 7 in a frame (not shown). The intermediate friction wheel 4, 5, 6 transmits its torque to a friction wheel 8 which frictionally engages a part 6 of the said intermediate wheel 4, 5, 6. The said intermediate wheel consists of a friction wheel part 4 driven by the motor shaft 3, a resilient part 5 in the form of a solid or hollow cylinder of rubber or similar elastomeric material, and a driving friction wheel part 6. The parts 4, 5 and 6 are axially connected together, for example by an adhesive, so that the entire unit 4, 5, 6 represents a composite friction wheel, the driven part 4 and the driving part 6 being torsionally resiliently connected with each other.

In a modification, instead of the resilient part 5 being provided, an inner region of the part 4 may be made of resilient elastomeric material, such as rubber and the part 4 connected directly to the part 6 by the shaft 7 which should then be rotatably mounted, the arrangement thus being such that the resilient region of the part 4 is subjected to a torsional load in operation.

I claim:
1. In a magnetic recording device having an electric motor, a motor drive shaft and a first friction wheel to be driven by said motor drive shaft, the improvement comprising means interengaging said motor drive shaft with said driven friction wheel for damping oscillation frequency of said motor drive shaft,
    said means comprising a second friction wheel operatively engaged with said drive shaft, a third friction wheel operatively engaged with said first friction wheel,
    said second and third friction wheels being connected together by torsional resilient means.
2. The improvement of claim 1, wherein said torsional resilient means, said second friction wheel and said third friction wheel are axially aligned.
3. The improvement of claim 1 wherein the inherent resonant frequency of said connected second third friction wheels is below the lowest torsional oscillation frequency said said drive shaft.
4. The improvement of claim 1, wherein said torsional resilient means comprises an elastomeric material.
5. In a magnetic recording device having an electric motor, a motor drive shaft and a first friction wheel to be driven by said motor drive shaft, the improvement comprising means interengaging said motor drive shaft with said first friction wheel for damping oscillation frequency of said motor drive shaft during rotation of said shaft,
    said means comprising a second friction wheel operatively engaged with said drive shaft, a third friction wheel axially aligned with said second friction wheel and operatively engaged with said first friction wheel, said second and third friction wheels being interconnected through a resilient torsion means for damping oscillation frequency of said second friction wheel imparted by said drive shaft.

6. The improvement of claim 5, wherein said torsion means comprises a cylinder of an elastomeric material extending between said second and third friction wheels and rigidly secured thereto.

7. The improvement of claim 5 wherein said torsion means comprises an elastomeric material connected with one of said second or third friction wheels, said one friction wheel being fixed with respect to a mounting shaft mounting said one wheel through said elastomeric material, said mounting shaft also carrying the other of said second and third friction wheels fixed thereon.

References Cited by the Examiner

UNITED STATES PATENTS

| | | | |
|---|---|---|---|
| 1,229,417 | 6/1917 | Daft | 74—574 X |
| 2,485,848 | 10/1949 | Sharp. | |
| 2,785,580 | 3/1957 | Andrews | 74—432 |
| 2,857,777 | 10/1958 | Porter | 74—432 |
| 2,925,738 | 2/1960 | Coven et al. | 74—190 X |
| 2,952,143 | 9/1960 | Case | 64—11 |
| 3,023,593 | 3/1962 | Nallinger | 74—574 X |
| 3,078,737 | 2/1963 | McGavern | 74—574 |
| 3,174,348 | 3/1965 | Luenberger | 74—230.17 |
| 3,175,110 | 3/1965 | Kohlhagen | 74—411 X |

DAVID J. WILLIAMOWSKY, *Primary Examiner.*

DON A. WAITE, *Examiner.*

R. J. BIRD, L. H. GERIN, *Assistant Examiners.*